Dec. 27, 1927.   1,653,744
K. STENSAETER
ARRANGEMENT FOR INDICATION OF THE POSITION OR DIRECTION OF
THE STEERING WHEELS IN VEHICLES
Filed April 23, 1924    2 Sheets-Sheet 2

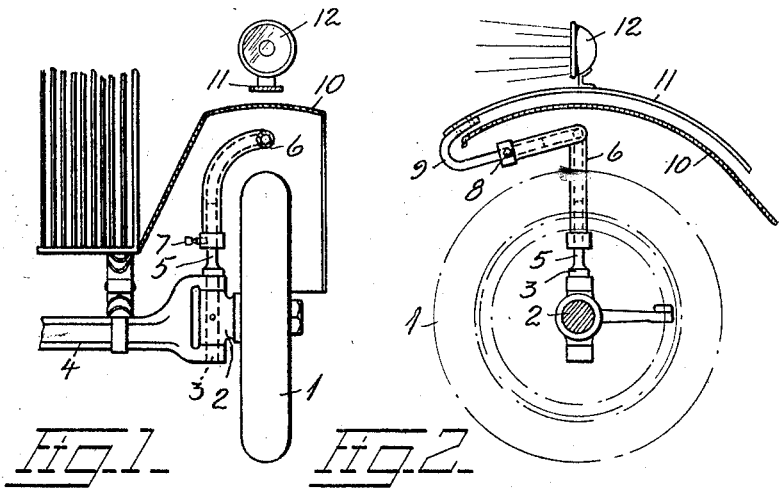
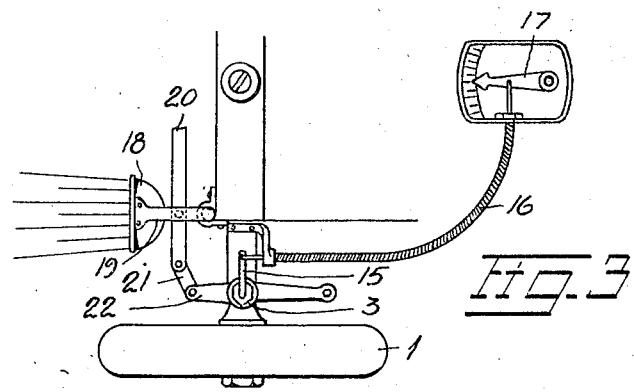
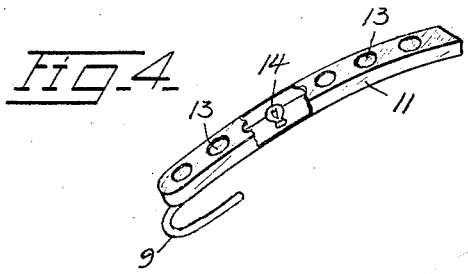

Inventor
K. Stensaeter
By Marks & Clerk
Attys.

Patented Dec. 27, 1927.

1,653,744

UNITED STATES PATENT OFFICE.

KRISTOFFER STENSÆTER, OF VALDRES, NORWAY.

ARRANGEMENT FOR INDICATION OF THE POSITION OR DIRECTION OF THE STEERING WHEELS IN VEHICLES.

Application filed April 23, 1924, Serial No. 708,578, and in Norway May 15, 1923.

Drivers of automobiles and the like vehicles, and especially beginners in the art of driving, often consider it a drawback that they are not able to always observe from the driver's seat the position of the front wheels, because the mud guards are so situated that the wheels can not be directly seen from the said seat.

It is the object of the present invention to remove the said drawback by providing an arrangement which in every moment shows the exact position and movement of the front wheels sidewards. This is made by arranging, at a place which is easily observed from the driver's seat, a hand or other direction indicator which is so connected to the pivot or the hub of the front wheel or wheels, that the hand or indicator is caused to move corresponding to those movements of the front wheels which are caused by the driver's turning of the steering hand wheel.

Another object is to provide an arrangement of the above mentioned type which also acts satisfactory when the vehicle is driven in darkness. This is obtained by making the direction indicator hollow, placing a source of light therein and providing suitable perforations or transparent portions through which the light from the said source may radiate, or by combining the lanterns with the indicator in such manner that the lanterns and the indicator are moved in unison.

The annexed drawings show, by way of example, some embodiments of my invention.

Fig. 1 is a front view of an arrangement according to my invention, partially in section.

Fig. 2 is a side view thereof, also partially in section.

Fig. 3 is a top view of a modified arrangement, parts being removed for sake of clearness.

Fig. 4 is a perspective view of a modified form of the proper direction indicator, a portion being broken away to show the inner part thereof.

Figure 5:
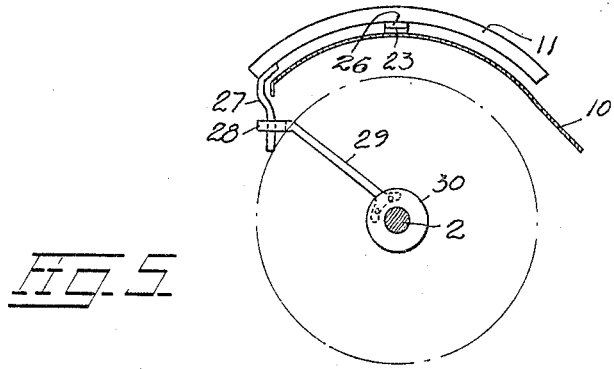
Fig. 5 shows still another form of the arrangement, seen from the side and partially in section.

In Figs. 1 and 2 —1— is a front wheel and —2— the stub shaft on which the wheel is rotating. By means of the pivot —3— the stub shaft arrangement is connected to the front bar —4— in the usual way. According to my invention the pivot —3— may be provided with an extension —5— to which is demountably secured a tube —6— by means of a set screw —7—. The upper portion of the tube is so bent that it extends forward just over the wheel —1— and parallel thereto. In the other end of the tube —6— is secured a rod —9— by means of a set screw —8—. The rod —9— extends past the foremost edge of the mud guard —10—, there it is bent upward and then backward, and has secured thereto a bar or plate —11— extending somewhat backward along the upper side of the mud guard.

When the pivot —3— turns according to the sideward movements of the wheel —1— caused by the steering operations, the plate —11— will move in accordance therewith, and thus serve as a wheel direction indicator, which may easily be observed from the driver's seat and which in every movement indicates the exact position of the front wheels.

If the pivot —3— is of the type which is rigidly secured to the bar —4— so that the hub of the wheel is swinging on the said pivot, the lower end of the tube —6— should be secured to a rod fast on the hub (not shown).

As will be seen the direction indicator arrangement may be adjusted as regards its height position as well as its longitudinal position, by means of the set screws —7— and —8— respectively. Thus a standard arrangement may be adjusted to suit vehicles of practically all types and dimensions.

In order that the described arrangement shall fulfill its purpose also in darkness, the plate —11—, or the operating parts —3—, —5—, —6— or —9— thereof may be connected to or combined with some suitable source of light. According to Figs. 1 and 2 the said source of light may be an electric lamp or lantern —12— secured to the plate —11—.

In lieu of securing a source of light on the proper wheel direction indicator so that a beam of light is projected forward in the longitudinal direction of the said indicator, the indicator proper may be made luminous. This may be made by coating the direction indicator with some compound which emits light or by using an arrangement of the type shown in Fig. 4. Here the indicator —11— is hollow and the top wall thereof is provided with holes —13— covered by a suitable transparent material. Within the indicator —11— is or are arranged one or several electric lamps —14—. Thus the indicator will be seen against the mud guard as clearly in darkness as in full day light. Obviously the entire top portion of the indicator may be covered with a transparent plate, in lieu of only providing holes in the top plate.

In Fig. 3 is shown a modified arrangement of my invention. To the pivot —3— is secured a lever —15— which moves in unison with the front wheel —1—. Through a Bowden-wire —16— the lever is connected with a hand member —17—, so situated that it may easily be observed from the driver's seat. Thus the position or movement of a hand —17— will correspond with the position or movement of the lever —15—, and accordingly also with the position or movement of the front wheels, and the driver only need to observe the hand —17— in order to know the position of the front wheels.

The hand —17— may, if desired, be made luminous in one of the manners previously described.

Also if the arrangement according to Fig. 3 is used, it may be desirable to mount the lanterns or lamps of the vehicle in such manner that they may serve as wheel direction indicators in darkness. Such arrangement may be as shown in Fig. 3. The lanterns are by means of an arm 19 pivotally connected to the frame of the vehicle or to some other suitable fixed member of the vehicle. The lanterns are interconnected by means of a rod 20 or, if permissible, to the parallel bar of the stearing mechanism. The rod 20 is by means of a suitable link 21 connected to an arm 22 on the pivot 3. Thus the rod —20— and accordingly also the lanterns —18— will move corresponding to the movement of the wheel —1—.

Figure 6:
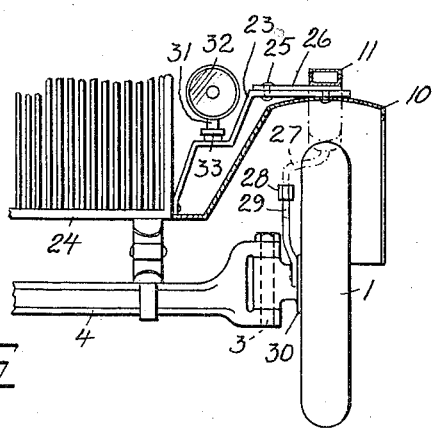
Fig. 6 is a front view of the arrangement of Fig. 5 partially in section.
Figure 7:
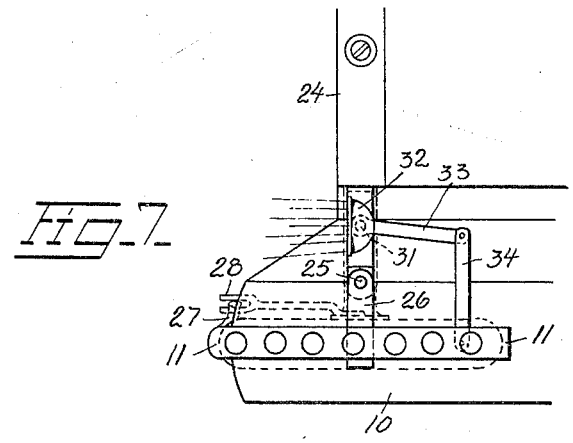
Fig. 7 is a top view thereof.

In Figs. 5-7 is shown another arrangement, in which the lanterns and the wheel direction indicator means are moved simultaneously.

A frame or bracket 23 has its lower end secured to the lower portion of the radiator —24— and its upper end secured to the mud guard 10. To the bracket 23 is, by means of a pivot —25— secured an arm 26 to the outer end of which is rigidly connected the direction indicator —11—. The pivot —25— is preferably so situated that the center line of the pivot —3— will pass therethrough if extended. The front end of the member —11— carries an arm —27—, extending somewhat downward and inward. To the inner side of a flange —30— on the wheel hub is secured an arm —29— extending forward and somewhat upward. The free end of the arm —29— is forked at —28—, and the lower end of the arm —27— extends between the said fork members.

Thus the sideward movements of the wheel —1— act, through the arm —29—, fork —28— and arm —27—, to move the member —11— which swings on its pivot —25—, according to the movements of the wheel —1—. However, as regards vertical movements of the wheel —1— in relation to the radiator —24— and the mud guard —10—, the fork —28— and arm —27— represent a lost motion connection, and accordingly shocks which the wheel receives by reason of stones and unevennesses on the road, are not imparted to the member —11—, but are only taken up in the usual way by the springs of the vehicle.

On the bracket —23— is pivotally mounted a lantern —32— to the pivot —31— of which is secured an arm —33—, which by means of a link —34— is connected to the member —11—. Accordingly also the lantern —32— will swing in accordance with the movements of the member —11—.

If the lanterns are situated near the wind screen (not shown) they may be pivotally mounted and connected to the lever —15— by means of a Bowden-wire connection or the like, so that they are moved in unison with the wheels —1—.

Having now particularly described and ascertained the nature of my said invention, and in what manner the same is to be performed, I declare that what I claim is:

The combination with a motor vehicle including a body, a wheel guard, and a front wheel mounted for steering movement, of a bracket connected with and supported by the vehicle body and wheel guard, an indicator including a member curved substantially in conformity with the curvature of the wheel guard and overlying the latter, a laterally extending arm carried by the indicator, means pivotally connecting said arm with the said bracket at a point in vertical line with the axis of steering movement with the front wheel, said indicator lying in the same vertical plane with the front wheel, and means for transmitting steering movement of the front wheel to the indicator.

In testimony whereof I have signed my name to this specification.

KRISTOFFER STENSÆTER.